United States Patent
Hatfield et al.

(10) Patent No.: US 12,373,160 B2
(45) Date of Patent: Jul. 29, 2025

(54) VIRTUAL CONTENT TRANSFER

(71) Applicant: Lenovo (Singapore) Pte. Ltd., Singapore (SG)

(72) Inventors: Nathan Hatfield, Raleigh, NC (US); Daniel Pollack, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 173 days.

(21) Appl. No.: 17/534,060

(22) Filed: Nov. 23, 2021

(65) Prior Publication Data
US 2023/0161544 A1    May 25, 2023

(51) Int. Cl.
    G06F 3/04842    (2022.01)
    G06F 3/04845    (2022.01)
    G06F 3/147      (2006.01)
    G06F 3/16       (2006.01)

(52) U.S. Cl.
    CPC .......... *G06F 3/147* (2013.01); *G06F 3/04842* (2013.01); *G06F 3/04845* (2013.01); *G06F 3/167* (2013.01)

(58) Field of Classification Search
    USPC ........................................ 715/728
    See application file for complete search history.

(56) References Cited

U.S. PATENT DOCUMENTS

| | | | |
|---|---|---|---|
| 9,858,720 B2 * | 1/2018 | da Veiga | G06F 3/04815 |
| 10,484,508 B2 * | 11/2019 | Clement | A63F 13/428 |
| 10,706,628 B2 * | 7/2020 | Nicholson | H04L 67/06 |
| 10,922,862 B2 * | 2/2021 | VanBlon | G02B 27/0179 |
| 2012/0177067 A1 * | 7/2012 | Cho | H04N 21/41265 370/503 |
| 2014/0040803 A1 * | 2/2014 | Briand | G06F 3/0486 715/769 |
| 2014/0208237 A1 * | 7/2014 | Happonen | G06F 3/0488 715/753 |
| 2014/0282103 A1 * | 9/2014 | Crandall | H04L 65/1093 715/753 |
| 2016/0027216 A1 * | 1/2016 | da Veiga | G06F 3/013 345/158 |
| 2017/0285758 A1 * | 10/2017 | Hastings | G06F 3/03545 |
| 2018/0124497 A1 * | 5/2018 | Boesen | H04R 1/1091 |
| 2019/0266801 A1 * | 8/2019 | Nicholson | G06F 9/543 |
| 2020/0363924 A1 * | 11/2020 | Flexman | G06T 19/006 |

* cited by examiner

*Primary Examiner* — Henry Orr
(74) *Attorney, Agent, or Firm* — FERENCE & ASSOCIATES LLC

(57) ABSTRACT

One embodiment provides a method, including: displaying, on a display screen of an augmented reality device, augmented reality content; detecting, using a processor, an indication to transfer the augmented reality content from the augmented reality device to an information handling device; and transferring, responsive to the detecting, the augmented reality content from the augmented reality device to the information handling device. Other aspects are described and claimed.

14 Claims, 4 Drawing Sheets

VIRTUAL CONTENT TRANSFER

BACKGROUND

Information handling devices ("devices"), for example smart phones, tablet devices, head-mounted displays ("HMDs"), laptops and personal computers, and the like, may be capable of exchanging content with another device. The content transfer task may be initiated responsive to receiving some type of user command input, e.g., a voice command, a touch command, a gesture command, and the like.

BRIEF SUMMARY

In summary, one aspect provides a method, including: displaying, on a display screen of an augmented reality device, augmented reality content; detecting, using a processor, an indication to transfer the augmented reality content from the augmented reality device to an information handling device; and transferring, responsive to the detecting, the augmented reality content from the augmented reality device to the information handling device.

Another aspect provides an augmented reality device, including: a display screen; a processor; a memory device that stores instructions executable by the processor to: display augmented reality content; detect an indication to transfer the augmented reality content from the augmented reality device to an information handling device; and transfer, responsive to the detecting, the augmented reality content from the augmented reality device to the information handling device.

A further aspect provides a method, including: identifying, using an augmented reality device, content displayed on a display screen of an information handling device; selecting, responsive to receipt of a user command, the content; and facilitating, responsive to the selecting, a transfer of the content from the display screen of the information handling device to an augmented display area of the augmented reality device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
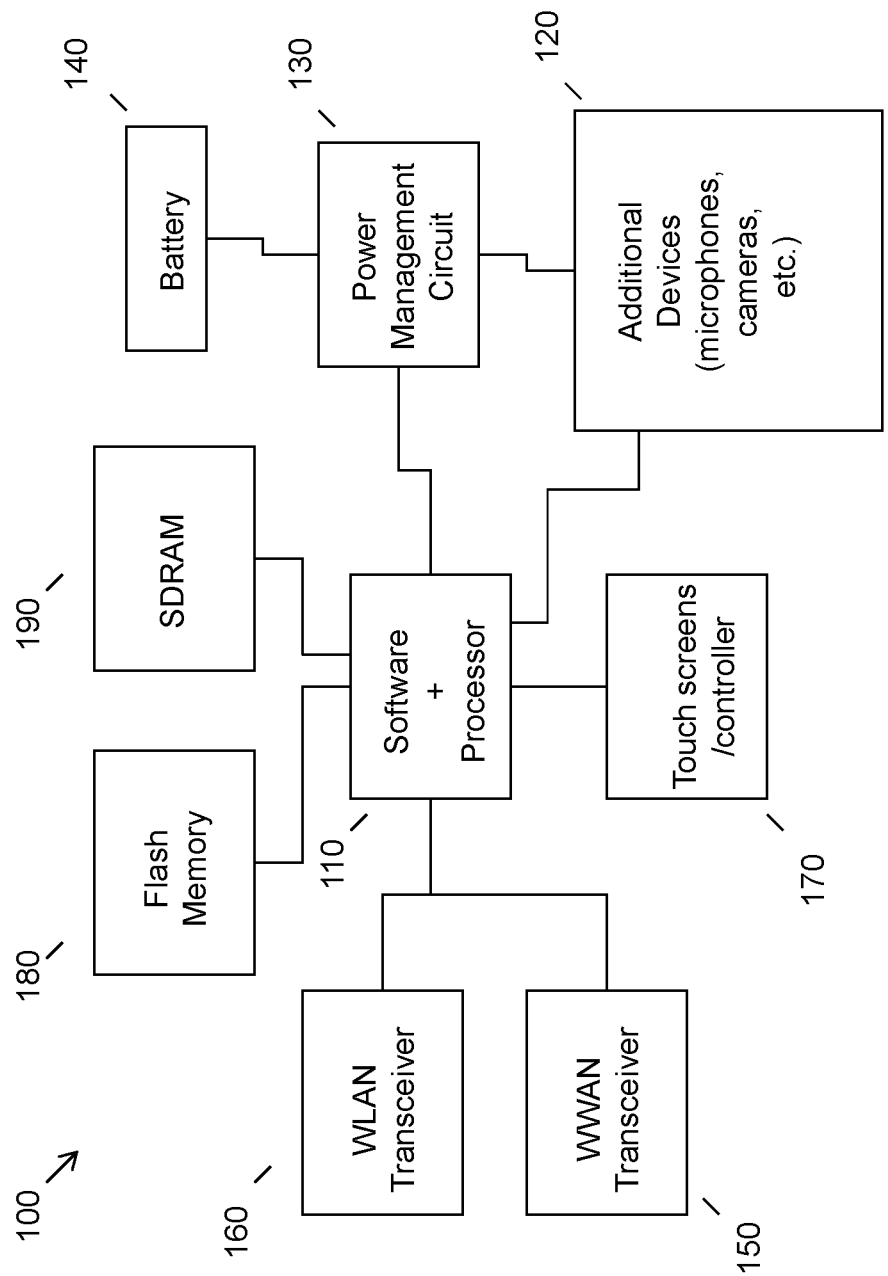
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Various types of techniques exist today to transfer content (e.g., files, documents, images, videos, etc.) from one electronic device to another. For example, a user may transmit the content as part of a message (e.g., an email, an SMS text message, a social media message, etc.) via the Internet. As another example, content data may be communicated between devices via a wireless connection (e.g., using a BLUETOOTH connection, near field communication (NFC), another type of wireless connection technique, etc.) or a wired connection (e.g., the device is coupled to another device via one or more cables, etc.).

As augmented reality (AR) devices and applications become more integrated into society, a need exists for a more seamless way to transfer AR content resident on an AR-enabled device to a conventional electronic device (e.g., a physical desktop, etc.), and vice versa. At present, AR applications allow users to visualize AR content within a head-mounted display (HMD) or another AR-enabled device. This content may be managed through cloud services or ported to a physical desktop environment. However, this transfer process generally takes multiple steps and can be burdensome.

Accordingly, an embodiment provides a method of fluidly transferring content between an AR-enabled device and another device. In an embodiment, AR content may be displayed on a screen of an AR-enabled device (e.g., an HMD, etc.). An embodiment may then detect an indication to transfer the AR content from the AR device to another device. This indication may manifest in one or more ways. For example, a user may select and drag the AR content to a predetermined bounding area of the display (e.g., an edge of the display, etc.). The movement of AR content into this bounding area may provide an indication to the system to transfer the AR content to an associated device. As another example, the AR device may identify another device within its field of view and may receive the indication to transfer the AR content to the other device responsive to receiving a command from a user to do so (e.g., a gesture command, an audible command, etc.). Subsequent to the indication detection, an embodiment may then automatically transfer the AR content to the other device.

In the opposite scenario, digital content resident on a conventional device may be transferred seamlessly to the AR-enabled device. In an embodiment, content displayed on a display screen of an electronic device may be identified by an AR-enabled device. An embodiment may then select, from the AR-enabled device, the content displayed on the electronic device. This selection may be facilitated in a variety of ways. For example, the AR-enabled device may generate a virtual cursor that may be spatially mapped to the display of the electronic device. A user may then control this cursor to select the content on the device's display. An indication of this selection may be transmitted to the electronic device which may then subsequently facilitate a transfer of the selected content to the AR-enabled device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
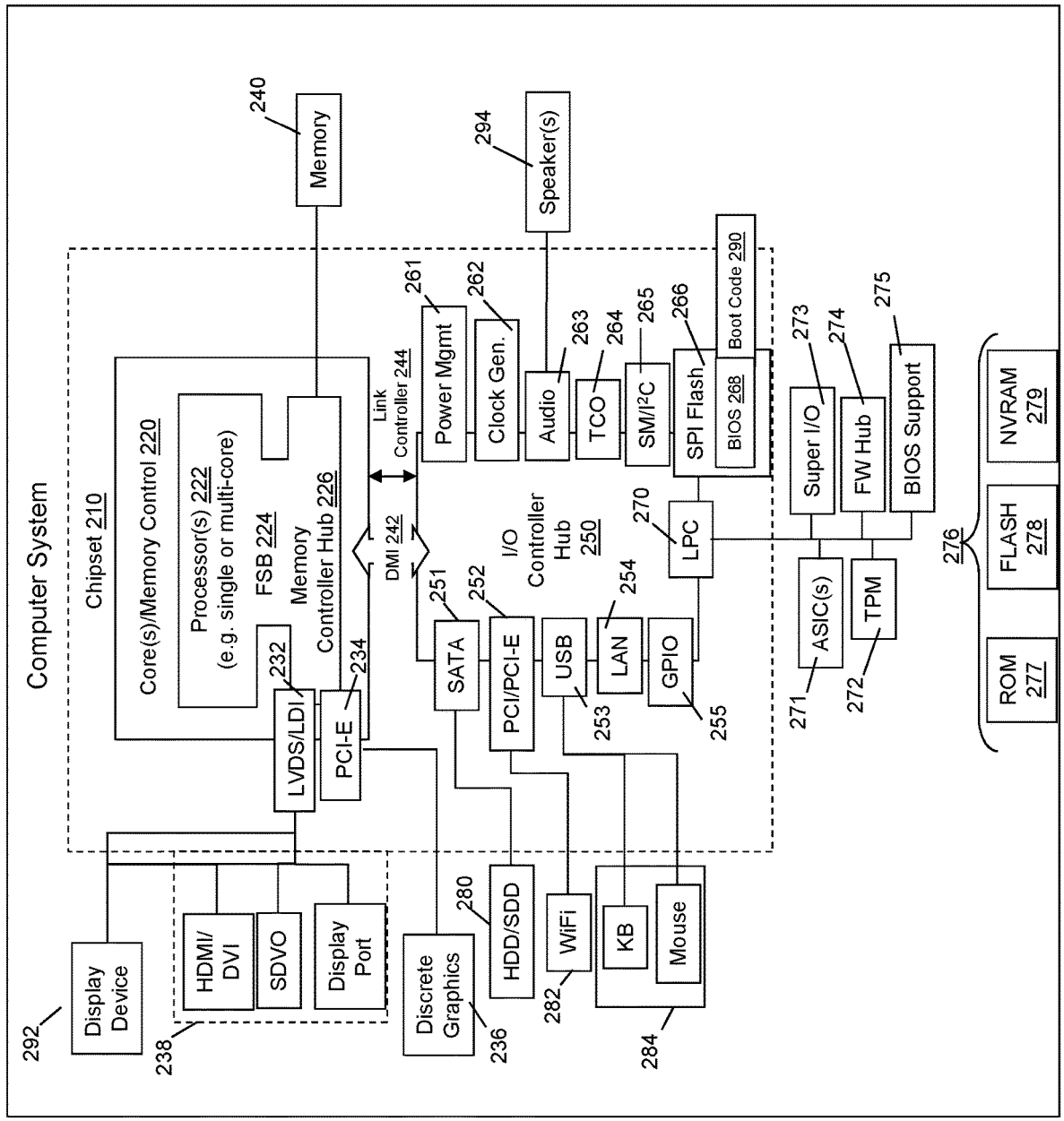
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, wearable headsets, personal computer devices generally, and/or electronic devices that are capable of displaying and managing augmented reality content. For example, the circuitry outlined in FIG. 1 may be implemented in a head-mounted display embodiment, whereas the circuitry outlined in FIG. 2 may be implemented in a personal computer embodiment.

Figure 3:
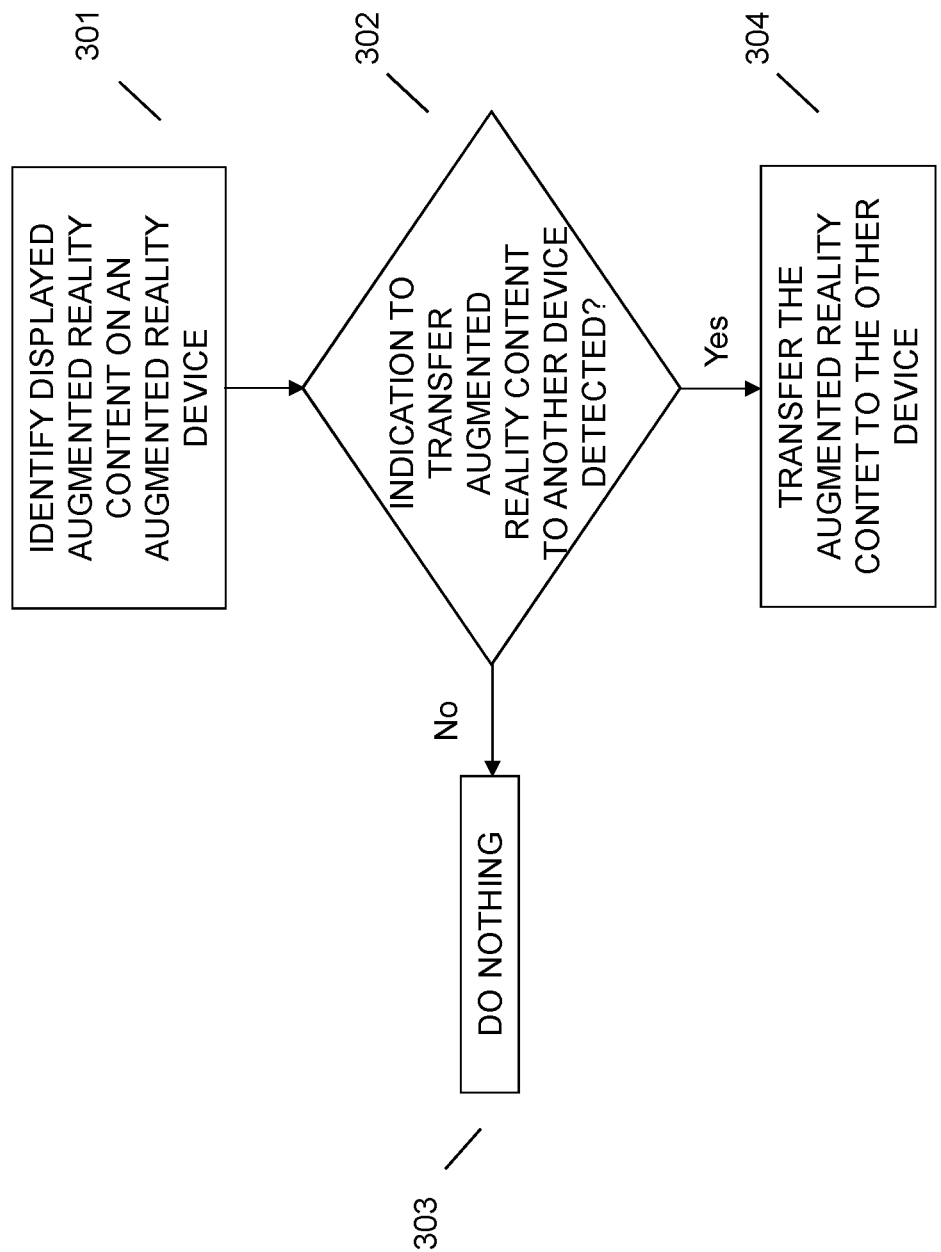
FIG. 3 illustrates an example method of transferring content from an augmented reality device to another electronic device according to an embodiment.

Referring now to FIG. 3, an embodiment may transfer content from an AR-enabled device to another electronic device. At 301, an embodiment may display AR content on a display screen of an AR-enabled device. In an embodiment, the AR content may be virtually any type of content (e.g., a file, a document, an image, a video, etc.). In the context of this application, an AR-enabled device may be virtually any device capable of supporting and displaying AR-enabled content. For simplicity purposes, the remainder of this application will be described with respect to an HMD as the AR-enabled device. However, it is important to emphasize that such a designation is not limiting.

At 302, an embodiment may determine whether an indication is detected to transfer the AR content from the AR device to another electronic device. In the context of this application, the target electronic device may be virtually any type of electronic device that can or cannot support and display AR content. For simplicity purposes, the remainder of this application will be described with respect to a physical desktop that cannot support AR content as the other electronic device. However, it is important to emphasize that such a designation is not limiting. The detection of the indication to transfer the AR content may be facilitated in one or more different ways, as further described below.

Predetermined Bounding Area Transfer

In an embodiment, the indication may be detected responsive to identifying that selected AR content has been moved into a predetermined bounding area of the HMD. In an embodiment, the predetermined bounding area may be virtually any defined space of the AR display (e.g., an edge portion of the display, an area occupied by a virtual AR transfer icon, etc.). This bounding area may be originally set by a manufacturer of the HMD and/or may later be adjusted by a user. In an embodiment, a user may select and move the AR content into the predetermined bounding area using one or more techniques. For example, a user may utilize AR gesture input (e.g., hand gestures, eye gestures, etc.) to select the AR content and move it to the predetermined bounding area. Additionally or alternatively, the movement may be facilitated in response to receipt of another user command (e.g., an audible user command to move the AR content to the predetermined bounding area, etc.).

In an embodiment, the predetermined bounding area may be associated with a particular device. Stated differently, movement of AR content into the predetermined bounding area may provide an indication to the system to transfer the content to a specific device. The determination of which device to transfer the content to may be based on a ruleset (e.g., stored locally on the device or remotely on another device or server, etc.) associated with the predetermined bounding area. For instance, the ruleset may designate a single device to transfer the AR content to (i.e., when content is moved into the predetermined bounding area an indication is received by the AR system to always transfer the AR content to the designated device). In an embodiment, the user may designate, in the ruleset, the exact device that the AR content gets transferred to.

In an embodiment, multiple predetermined bounding areas may exist that may each be associated with a unique device. For example, an AR display may have four bounding areas, i.e., one in each corner of the AR display. Each of these bounding areas may be associated with a unique device to transfer AR content to (i.e., as designated by a user). For instance, the top-left edge bounding area may be configured to transmit an indication to the AR system to transfer AR content to a user's home-based physical desktop, the top-right edge bounding area may be configured to transmit AR content to a user's work-based physical desktop, the lower-left edge bounding area may be configured to transmit AR content to a user's tablet, and the lower-right edge bounding area may be configured to transmit AR content to a user's smart phone.

In an embodiment, when AR content is selected to be transferred to another device, the predetermined bounding area(s) may be visually distinguished to a user in some way. For example, the predetermined bounding area may be: highlighted in a particular color, made to flash at predetermined intervals, identified via a push notification appearing on the AR display, etc.

Field-of-View Device Transfer

In an embodiment, the indication may be detected responsive to identifying that content has been selected to be transferred to another device within a field-of-view of a display of the AR device. More particularly, an embodiment may utilize one or more world-view camera sensors integrated into the AR device to detect (e.g., using one or more image analysis techniques known in the art, etc.) when another device comes into a field-of-view of the AR device. An embodiment may then attempt to pair or otherwise establish a wireless connection with this in-view device. Additionally or alternatively, the pairing attempt may only occur responsive to detecting a transfer command from a user, as further described below.

In an embodiment, the transfer command may be an audible command designating an article of AR content to be transferred to the in-view device (e.g., a user may provide the audible command "transfer the image of the car to the computer", etc.). Additionally or alternatively, the transfer command may involve repositioning the AR content to a location on the AR display that overlaps the target device. In such a situation, an embodiment may dynamically recognize an area of the AR display overlapping the target device as a de facto "bounding area" that may transmit an indication to the AR system to transfer the AR content to the target device when the AR content is repositioned within this defined area.

In an embodiment, an area of the AR display associated with an in-view device identified as a viable device to transfer content to may be visually distinguished to the user in some way. For example, the viable device may be: highlighted in a particular color, made to flash at predetermined intervals, identified via a push notification appearing on the AR display, etc.

Responsive to not detecting, at 302, an indication to transfer the AR content to another device, an embodiment may, at 303, take no additional action. Conversely, responsive to detecting, at 302, an indication to transfer the AR content to another device, an embodiment may, at 304, facilitate the transfer of the AR content to device identified in the detecting step. In an embodiment, this transfer process may occur automatically and without the receipt of any additional user input.

In an embodiment, the content transfer process may be facilitated in one or more different ways. For example, the AR content may be transferred from the AR device to the target device as part of a message (e.g., an email, an SMS text message, a social media message, etc.). In such a situation, the AR device would need to have the relevant contact data of the other device in order to facilitate the transfer. This contact data may be provided by a user and stored in an accessible database. As another example, the AR content may be transferred to the target device via a wireless connection technique (e.g., using a Wi-Fi Direct connection, a BLUETOOTH connection, a near field communication (NFC) connection, another type of wireless connection technique, etc.).

Figure 4:
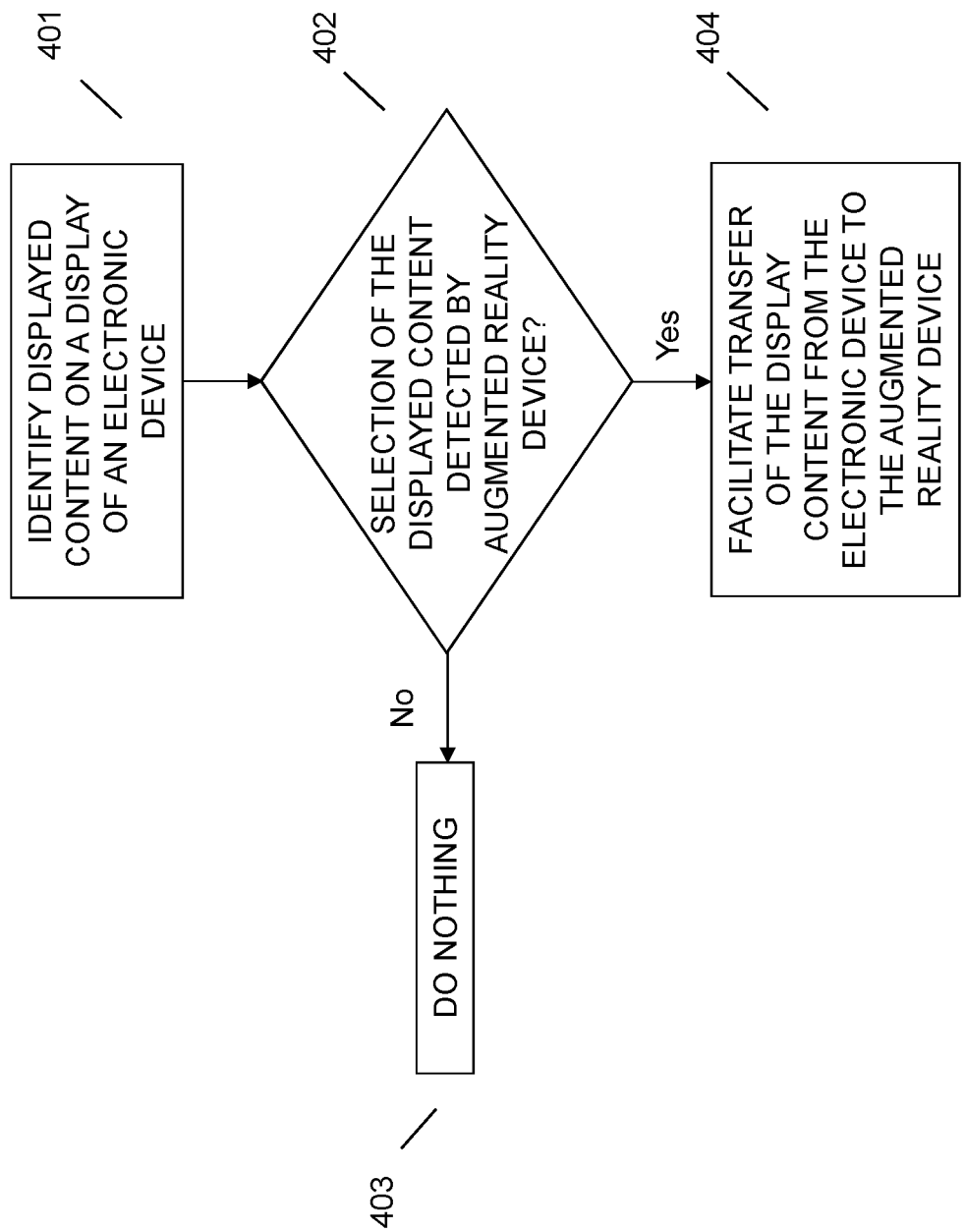
FIG. 4 illustrates an example method of transferring content from an electronic device to an augmented reality device according to an embodiment.

Referring now to FIG. 4, an embodiment may transfer digital content from an electronic device that is not AR-enabled to an AR-enabled device. At 401, an AR-enabled device may identify content displayed on a display screen of another device that is not AR-enabled (e.g., a physical desktop computer, a laptop, a smart phone, a tablet, etc.). This identification may be facilitated by capturing image data using one or more worldview camera sensors integrated into the AR-enabled device and subsequently analyzing that image data using one or more image analysis techniques known in the art.

At 402, an embodiment may utilize the AR-enabled device to select the digital content displayed by the non-AR device. In an embodiment, this selection may be facilitated by the instantiation of a virtual cursor that is mapped to the display screen of the non-AR device. More particularly, a user of the AR-device may manipulate an AR cursor (e.g., using hand or eye gesture input, etc.) to digitally "select" the desired content displayed on the non-AR device and move it into a predetermined bounding area of the physical display (e.g., an edge portion of the physical display, etc.). The movement of the digital content to the bounding area of the physical display may provide an indication to the system to bring the digital content into the virtual AR world.

Responsive to not receiving, at 402, a selection, an embodiment may, at 403, take no additional action. Conversely, responsive to receiving, at 402, a selection, an embodiment may, at 404, facilitate a transfer of the content displayed on the non-AR device to the AR-enabled device. In an embodiment, this transfer may occur automatically without additional user input and may take one of several forms.

In one embodiment, the transfer of the content from the physical device to the AR device may include capturing an image of the displayed content using one or more camera sensors of the AR-device. This captured image may then be transformed into an AR image (e.g., using one or more AR transformation techniques known in the art, etc.) and presented on a display of the AR device. A user may then interact and modify that image as they would with any other conventional AR image.

In another embodiment, the transfer may involve the actual transmission, from the non-AR device to the AR-enabled device, of a data file corresponding to the selected content. In such a situation, a connection may be established between the AR-enabled device and the non-AR device (e.g., using a Wi-Fi Direct connection, a BLUETOOTH connection, a near field communication (NFC) connection, another type of wireless connection technique, etc.) through which an instruction may be transmitted from the AR device to the non-AR device. This instruction may contain the necessary information needed for the non-AR device to identify which article of content to transfer to the AR-enabled device. For example, the instruction may request that the currently displayed image on the non-AR device be transferred from the non-AR device to the AR-enabled device. In another example, the instruction may contain more specific identifying information such as "please transfer the currently displayed image of the red car to X device".

The various embodiments described herein thus represent a technical improvement to conventional content transfer techniques. Using the techniques described herein, an embodiment may detect an indication to transfer AR content displayed on a display of an AR-enabled device to another device (e.g., another AR-enabled device, a non-AR device, etc.). Responsive to this detection, an embodiment may facilitate a transfer of the AR content. In the opposite situation, an embodiment may identify digital content displayed on a display screen of a non-AR device. An embodiment may utilize their AR-enabled device to select this content (using the techniques described above) and may then pull the digital content from the non-AR device into the virtual world of AR-enabled device. Such techniques enable more seamless and fluid transfer of content between AR-enabled devices and other devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, on a display screen of an augmented reality device, augmented reality content, wherein the displaying comprises identifying at least one information handling device within a field of view of the display screen;
    detecting, using a processor, an indication to transfer the augmented reality content from the augmented reality device to the at least one information handling device, wherein the detecting the indication comprises identifying movement of the augmented reality content to a predetermined bounding area of the display screen, wherein the predetermined bounding area comprises a visually distinguished defined space of the display screen adjustable by a user and further comprises an association with a unique device of the at least one information handling device within the field of view of the display screen; and
    transferring, responsive to the detecting and based on a ruleset designating a unique device, the augmented reality content from the augmented reality device to the unique device of the at least one information handling device within the field of view of the display screen, wherein the transferring comprises transferring the augmented reality content to the unique device responsive to identifying that the augmented reality content was moved to the predetermined bounding area of the display screen associated with the unique device of the at least one information handling device within the field of view of the display screen.

2. The method of claim 1, wherein the augmented reality device is one of: a head-mounted display device or a portable display device.

3. The method of claim 1, wherein the predetermined bounding area corresponds to an edge of the display screen.

4. The method of claim 1, wherein the transferring comprises wirelessly transferring the data from the augmented reality device to the information handling device.

5. The method of claim 1, wherein the predetermined bounding area comprises a plurality of predetermined bounding areas.

6. The method of claim 5, wherein the transferring comprises transferring the augmented reality content to the information handling device from the plurality of predetermined bounding areas;
    wherein the associated predetermined bounding comprises a transmission association to the information handling device.

7. The method of claim 1, wherein the detecting comprises detecting a user command to transfer the augmented reality content to the information handling device.

8. The method of claim 7, wherein the detecting the user command comprises detecting an audible instruction to transfer to the augmented reality content to the information handling device.

9. An augmented reality device, comprising:
    a display screen;
    a processor;
    a memory device that stores instructions executable by the processor to:
    display augmented reality content, wherein to display comprises identifying at least one information handling device within a field of view of the display screen;
    detect an indication to transfer the augmented reality content from the augmented reality device to the at least one information handling device, wherein the detecting the indication comprises identifying movement of the augmented reality content to a predetermined bounding area of the display screen, wherein the predetermined bounding area comprises a visually distinguished defined space of the display screen adjustable by a user and further comprises an association with a unique device of the at least one information handling device within the field of view of the display screen; and
    transfer, responsive to the detecting and based on a ruleset designating a unique device, the augmented reality content from the augmented reality device to the unique device of the at least one information handling device within the field of view of the display screen, wherein to transfer comprises transferring the augmented reality content to the unique device responsive to identifying that the augmented reality content was moved to the predetermined bounding area of the display screen associated with the unique device of the at least one information handling device within the field of view of the display screen.

10. The augmented reality device of claim 9, wherein the augmented reality device is one of: a head-mounted display device or a portable display device.

11. The augmented reality device of claim 9, wherein the predetermined bounding area corresponds to an edge of the display screen.

12. The augmented reality device of claim 9, wherein the predetermined bounding area comprises a plurality of predetermined bonding areas.

13. The augmented reality device of claim 9, wherein the instructions executable by the processor to detect comprise instructions executable by the processor to detect a user command to transfer the augmented reality content to the information handling device.

14. The augmented reality device of claim 13, wherein the instructions executable by the processor to detect the user command comprise instructions executable by the processor to detect an audible instruction to transfer the augmented reality content to the information handling device.

* * * * *